(12) United States Patent
McCarthy et al.

(10) Patent No.: US 9,019,033 B2
(45) Date of Patent: Apr. 28, 2015

(54) CONTACTLESS CONNECTOR

(71) Applicant: Tyco Electronics Corporation, Berwyn, PA (US)

(72) Inventors: Sean Patrick McCarthy, Palmyra, PA (US); Bruce Foster Bishop, Aplos, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 289 days.

(21) Appl. No.: 13/747,134

(22) Filed: Jan. 22, 2013

(65) Prior Publication Data

US 2013/0183902 A1   Jul. 18, 2013

Related U.S. Application Data

(63) Continuation-in-part of application No. 13/585,341, filed on Aug. 14, 2012.

(60) Provisional application No. 61/587,972, filed on Jan. 18, 2012.

(51) Int. Cl.
*H01P 5/04* (2006.01)
*H04B 7/24* (2006.01)
*H01P 5/00* (2006.01)
*H01P 3/123* (2006.01)
*H01P 5/02* (2006.01)

(52) U.S. Cl.
CPC .. *H04B 7/24* (2013.01); *H01P 5/00* (2013.01); *H01P 3/123* (2013.01); *H01P 5/024* (2013.01)

(58) Field of Classification Search
None
See application file for complete search history.

(56) References Cited

U.S. PATENT DOCUMENTS

| | | | |
|---|---|---|---|
| 5,459,441 A | 10/1995 | Weber et al. | |
| 6,507,323 B1 * | 1/2003 | West | 343/772 |
| 2005/0030118 A1 * | 2/2005 | Wang | 333/24 R |
| 2005/0057320 A1 * | 3/2005 | Brandt et al. | 333/24 R |
| 2005/0128024 A1 * | 6/2005 | Liess et al. | 333/24 R |

(Continued)

FOREIGN PATENT DOCUMENTS

| | | |
|---|---|---|
| EP | 0 632 525 A1 | 1/1995 |
| EP | 0 928 040 A1 | 7/1999 |

(Continued)

OTHER PUBLICATIONS

U.S. Appl. No. 13/585,341, filed Aug. 14, 2012, Sean Patrick McCarthy.
U.S. Appl. No. 13/336,705, filed Dec. 23, 2011, David Bruce Sarraf.
International Search Report, International Application No. PCT/US2014/010644, Internatinal Filing Date, Jan. 8, 2014.
International Search Report issued in related PCT application No. PCT/US2012/070312 dated Apr. 5, 2013.

*Primary Examiner* — Lincoln Donovan
*Assistant Examiner* — Khareem E Almo (57) ABSTRACT

A contactless connector includes a waveguide structure having a waveguide body extending between a first end and a second end and a septum received in the waveguide body and extend at least partially along an interior of the waveguide body. The septum divides at least a portion of the waveguide body into a first chamber and a second chamber. The waveguide structure conveys RF signals between the first and second ends. The contactless connector includes a communication module having a circuit board positioned at the first end of the waveguide body with transmit and receive communication chips coupled to the circuit board. The waveguide guides the RF signals from and to the transmit and receive communication chips, and the septum isolates the RF signals associated with the communication chips.

20 Claims, 7 Drawing Sheets

(56) References Cited

U.S. PATENT DOCUMENTS

| | | |
|---|---|---|
| 2007/0115077 A1 | 5/2007 | Chan |
| 2007/0229270 A1 | 10/2007 | Rofougaran |
| 2010/0102899 A1* | 4/2010 | Engel ............................ 333/117 |
| 2010/0191186 A1* | 7/2010 | Blumberg et al. ............ 604/151 |
| 2011/0063053 A1 | 3/2011 | Guler |
| 2011/0076944 A1* | 3/2011 | Mihota ........................ 455/41.2 |
| 2011/0230136 A1 | 9/2011 | Washiro |
| 2012/0038530 A1* | 2/2012 | Chen et al. .................... 343/771 |
| 2013/0057358 A1* | 3/2013 | Anthony et al. ................ 333/26 |
| 2013/0181791 A1* | 7/2013 | McCarthy et al. .......... 333/24 R |
| 2013/0183902 A1* | 7/2013 | McCarthy et al. ........... 455/41.2 |

FOREIGN PATENT DOCUMENTS

| | | |
|---|---|---|
| EP | 1 388 909 A1 | 2/2004 |
| JP | H04 207601 A | 7/1992 |
| JP | 2005 039414 A | 2/2005 |
| JP | 2011188185 A | 9/2011 |
| WO | 03/041214 A1 | 5/2003 |
| WO | 2013109376 A1 | 7/2013 |
| WO | 2013121221 A2 | 8/2013 |

* cited by examiner

CONTACTLESS CONNECTOR

CROSS REFERENCE TO RELATED APPLICATIONS

This application is a continuation-in-part application of U.S. application Ser. No. 13/585,341, which claims the benefit of U.S. Provisional Application No. 61/587,972 filed Jan. 18, 2012, the subject matter of each of which is herein incorporated by reference in its entirety.

This application discloses subject matter that relates to subject matter described in U.S. patent application No. 13/336,705 filed Dec. 23, 2011, titled CONTACTLESS CONNECTOR, the subject matter of which is herein incorporated by reference in its entirety.

BACKGROUND OF THE INVENTION

The subject matter herein relates generally to contactless connectors that provide contactless data transmission at short range using RF energy and waveguide structures for such contactless connectors.

Contactless connectors typically include a transmitter chip and a receiver chip. A data stream is furnished to the transmitter chip, which produces a modulated RF signal, such as at 60 GHz. That signal is propagated a short distance to the receiver chip, which demodulates the signal and recovers the original data stream. The chips have antennas to allow transmission of data between the connector pairs without the need for an electrical or optical connection. Multiple channels can be provided by using multiple transmitter chip and receiver chip pairs. To avoid crosstalk between channels, each chip pair is isolated from a neighboring pair by distance or by shielding.

Certain applications require spacing of the transmitter and receiver chips at distances that are too far for effective transmission by the chips. Additionally, certain applications require relative motion between the connector components. While the chips can be separated longitudinally within certain limits with little or no degradation in performance, beyond such limits the signal and performance are diminished. Separation allows reduced precision in the mated position of the connector carriers or even some compliance to allow for mismatch in the position of the connector carriers. Problems arise when complex translation is required. For example, translation in more than one direction is problematic and leads to signal degradation and/or transmission failure.

A need remains for a contactless connector that accommodates for adequate spacing and/or movement of the connector components.

BRIEF DESCRIPTION OF THE INVENTION

In one embodiment, a contactless connector having a waveguide structure including a waveguide body extending between a first end and a second end and a septum received in the waveguide body and extend at least partially along an interior of the waveguide body. The septum divides at least a portion of the waveguide body into a first chamber and a second chamber. The waveguide structure conveys RF signals between the first and second ends. The contactless connector includes a communication module having a circuit board positioned at the first end of the waveguide body, a transmit communication chip configured to transmit wireless RF signals and a receive communication chip configured to receive wireless RF signals. The transmit and receive communication chips are coupled to the circuit board. The waveguide guides the RF signals from and to the transmit and receive communication chips, and the septum isolates the RF signals associated with the transmit communication chip from the RF signals associated with the receive communication chip for at least a portion of a length of the waveguide body.

Optionally, the septum may be directly coupled to the circuit board and may extend from the circuit board along the waveguide body for a length of the waveguide body. The waveguide body may include a receptacle at the first end and a tube at the second end. The tube may have a smaller diameter than a diameter of the receptacle. The circuit board and transmit and receive communication chips may be received in the receptacle. The receptacle may guide the RF signals between the communication module and the tube. The receptacle may be frustoconical shaped with the tube at the smaller end of the receptacle. The RF signals may be guided between the tube and the communication module through the frustoconical shaped portion of the receptacle.

Optionally, the circuit board may include a ground plane and conductive vias electrically connected to the ground plane. The septum may have mounting posts received in the conductive vias to electrically connect the septum to the ground plane of the circuit board. The septum may have a stepped distal end opposite the communication module. Optionally, the septum may engage an internal surface of the waveguide body by in interference fit. The septum may be electrically commoned with the waveguide body. The septum may be profiled to match an interior surface of the waveguide body.

In another embodiment, a contactless connector is provided having a waveguide structure including a first waveguide module and a second waveguide module configured to wirelessly communication RF signals therebetween. The first waveguide module has a first waveguide body and a first septum received in the first waveguide body and the second waveguide module has a second waveguide body and a second septum received in the second waveguide body. A first communication module is coupled to the first waveguide module. The first communication module includes a first circuit board having a transmit communication chip and a receive communication chip on the first circuit board. The first waveguide module guides corresponding RF signals from and to the transmit and receive communication chips. The first septum isolates the RF signals associated with the transmit communication chip from the RF signals associated with the receive communication chip for at least a portion of a length of the first waveguide body. A second communication module is coupled to the second waveguide module. The second communication module includes a second circuit board having a transmit communication chip and a receive communication chip on the second circuit board. The second waveguide module guides corresponding RF signals from and to the transmit and receive communication chips. The second septum isolates the RF signals associated with the transmit communication chip from the RF signals associated with the receive communication chip for at least a portion of a length of the second waveguide body.

DETAILED DESCRIPTION OF THE INVENTION

Embodiments described herein provide a contactless connector having two modules that form a data link. A waveguide structure is provided that connects the two modules for guiding and shielding the data link. The waveguide structure directs the energy along a particular path to enhance the communication link between the two modules. The modules may include RF transmitters and receivers, which may be chips, for the purpose of communicating wirelessly with similar chips and transmitter/receivers. The transmission and reception of RF signals to and from these chips is dependent on the relative position of the chips as well as the positions and orientation of the waveguide structure and/or the transmitters, receivers, antenna structures, groundplanes and other structures contained within the contactless connector.

Embodiments described herein provide a waveguide structure that is external to the chips. The waveguide structure may be used to collect, re-direct, extend the propagation distance, change the propagation direction, change the propagation mode, change the polarization, combine multiple modes, shield the transmitted/received signals from interfering signals, and the like.

Embodiments described herein provide a waveguide structure that may be manufactured from a number of different materials including dielectric materials, dielectric materials with metallized surfaces, metal plates and tubes, conductive plastics, hollow metal guides, air and the like. The waveguide structure may contain antennas, horns or other structures for collecting the signals. The waveguide structure may include a waveguide for directing and extending the length of propagation of the signal path. The waveguide structure may include a mode converter for changing the waveguide mode and/or the polarization. The waveguide structure may include a mode coupling structure for combining multiple waveguide modes from/to multiple transmitters/receivers. The waveguide structure may include a metal shield to protect the signal from interference. The waveguide structure may be cylindrical in shape, rectangular in shape or have another shape.

Embodiments described herein may include a rotary joint in the waveguide structure between the two modules. The use of axisymmetric EM modes may make the signal strength independent of the relative angle of rotation between the first module and the second module. The waveguide structure may have one or more gaps or breaks, and the gap(s) may be made of a material that differs from the waveguide material. For example, a plastic waveguide may have a gap which contains air, water, flesh, vacuum, glass or other non-metal. The waveguide may increase the allowable separation distance between the RF-based chips by reducing the divergence of the RF signal emitted by the first chip and maintaining an acceptable level of signal strength at the receiving chip. The waveguide may reject sources of external noise and improve the signal-to-noise ratio of the system for a given separation distance.

Embodiments described herein may include modules having only a single transmission line. For example, the first module could contain a single transmit-only chip and the second module could contain a single receive-only chip to form a unidirectional single-channel communication channel. In other embodiments, both modules could contain a single transmit-receive chip, with each chip set to a fixed function (e.g. transmit or receive) to form a unidirectional single-channel communication channel. The direction of the communication channel could be set at will by reversing the function of each of the two chips. In other embodiments, both modules could contain a single transmit-receive chip. Embodiments described herein may include modules having multiple transmission lines. For example, the system can consist of modules having two or more RF-based chip sets. Embodiments may provide the first module with two transmit chips and the second module with two receive chips for a two-channel, single-direction system. Other embodiments may provide one transmit chip and one receive chip in each module to form a two-channel bidirectional system (e.g. full duplex communication). Other embodiments may have multiple transmit-receive chips.

Figure 1:
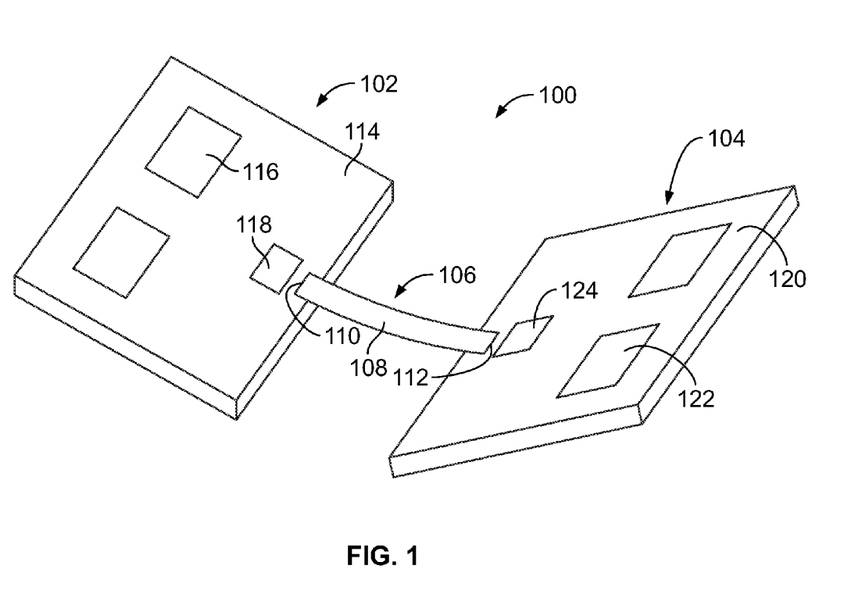
FIG. 1 illustrates a contactless connector formed in accordance with an exemplary embodiment.

FIG. 1 illustrates a contactless connector 100 formed in accordance with an exemplary embodiment. The connector 100 includes a first module 102 and a second module 104 that provides contactless data transmission at short range using RF energy. A propagation path is defined between the first and second modules 102, 104 and provides a defined transmission path for the RF energy between the first and second modules 102, 104. In an exemplary embodiment, the propagation path includes a waveguide structure 106 that guides the RF energy along a predetermined path between the first and second modules 102, 104. The waveguide structure 106 may extend along only part of the path between the first and second modules 102, 104. The waveguide structure 106 may be any type of propagation path, including an air gap between the first and second modules 102, 104. The waveguide structure 106 may be non-continuous and may span across different interfaces and/or materials.

In the illustrated embodiment, the waveguide structure 106 is defined by a waveguide 108 that extends between a first end 110 and a second end 112. The first and second ends 110, 112 are positioned adjacent the first and second modules 102, 104. Optionally, the waveguide 108 may have a rotary joint that allows relative rotation and/or linear translation at the joint.

In an exemplary embodiment, the first module 102 defines a transmitter (and/or a receiver) and the second module 104 defines a receiver (and/or a transmitter) for receiving the RF energy emitted by the transmitter. The first module 102 may be referred to hereinafter as a transmitter 102. The second module 104 may be referred to hereinafter as a receiver 104. In an alternative embodiment, the first module 102 defines a receiver and the second module 104 defines a transmitter. Optionally, the first module 102 may define both a transmitter and a receiver and the second module 104 may define both a transmitter and a receiver. The first and second modules 102, 104 may allow single directional communication or may allow bi-directional communication.

In an exemplary embodiment, the connector 100 may allow duplex communication between the first module 102 and the second module 104. Multiple transmit and receive pairs may produce multiple communication channels through the waveguide structure 106 between the first module 102 and the second module 104. Each channel may use a distinct and separable polarization mode to provide isolation between the RF signals of the various communication channels.

In an exemplary embodiment, the first module 102 includes a circuit board 114 having one or more electrical components 116 thereon. The first module 102 includes a first communication chip 118 that emits RF signals. The first module 102 may have more than one communication chip and the communication chip may define a transmitter chip, a receiver chip or a transceiver chip that is able to both transmit and receive. The second module 104 includes a circuit board 120 having one or more electrical components 122 thereon. The second module 104 includes a second communication chip 124 that receives RF signals. The second module 104 may have more than one communication chip and the communication chip may define a transmitter chip, a receiver chip or a transceiver chip that is able to both transmit and receive. The chips 118, 124 may have an antenna for transmitting/receiving the RF signals. The antenna may be integrated into the chip or may be a separate component connected to the chip.

The RF signals are emitted from the first module 102 into the waveguide structure 106 as RF energy. The waveguide structure 106 conveys the RF signals to the second module 104. The first module 102 sends the signals as RF data transmissions and the waveguide structure 106 conveys the RF data transmissions to the second module 104. The second module 104 receives the RF data transmissions from the waveguide structure 106 and recovers the RF data transmissions. In an exemplary embodiment, multiple RF data transmissions may be conveyed by the waveguide structure 106 having different propagation modes allowing such signals to be conveyed in the same space and allowing such signals to be separable.

Figure 2:
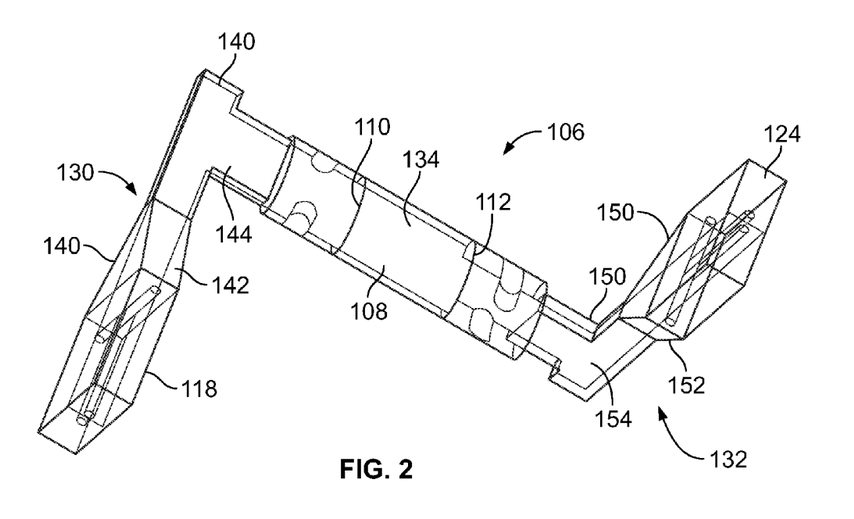
FIG. 2 illustrates the contactless connector.

FIG. 2 illustrates the contactless connector 100 showing the waveguide structure 106 between the first and second communication chips 118, 124 of the first and second modules 102, 104. The circuit boards 114, 120 (shown in FIG. 1) are removed for clarity.

The waveguide structure 106 includes the waveguide 108, a first waveguide module 130 at the first end 110 of the waveguide 108 and a second waveguide module 132 at the second end 112 of the waveguide 108. The first and second waveguide modules 130, 132 direct the RF signals from/to the chips 118, 124 and from/to the waveguide 108. The waveguide structure 106 may be used without waveguide modules at one or both ends of the waveguide 108 in alternative embodiments.

The waveguide 108 has a waveguide body 134 extending between the first end 110 and the second end 112. The waveguide 108 facilitates longer pathlength communication by directing the RF signals along a predetermined path. Optionally, the waveguide body 134 may provide shielding from interfering signals. The waveguide body 134 may be a hollow metal tube, such as a copper tube. The waveguide body 134 may be a plastic, ceramic, glass or other body. The waveguide body 134 may be manufactured from multiple pieces. The pieces may be movable relative to one another. The waveguide body 134 may be cylindrical or may have other shapes in alternative embodiments. The waveguide body 134 may extend along a longitudinal axis or may extend along a curved or angled path.

The first waveguide module 130 has one or more passive components 140 between the first communication chip 118 and the waveguide 108. The passive components 140 receive the wireless RF transmission from the first communication chip 118 and convey the RF signal to the waveguide 108. Optionally, the passive components 140 may be integral with each other. Optionally, the passive components 140 may be integral with the waveguide 108. For example, the passive components 140 may be co-molded, extruded, machined or otherwise formed simultaneously with one another and/or the waveguide 108. In alternative embodiments, the passive components 140 may be separate from one another and/or the waveguide 108. In such embodiments, the passive components 140 may be positioned adjacent one another and/or the waveguide 108. The passive components 140 may abut against one another and/or the waveguide 108. The passive components 140 may be positioned proximate to one another and/or the waveguide 108.

The passive components 140 enhance the communication link between the first and second communication chips 118, 124. The passive components 140 may have desired characteristics to affect the RF signals in a particular way to enhance the RF signals. For example, the passive components 140 may be used to collect the RF signals from the first communication chip 118. The passive components 140 may be used to re-direct the RF signals along a predetermined path or in a certain direction. The passive components 140 may be used to extend the propagation distance of the RF signals. For example, the passive components 140 may maintain the signal at a sufficient strength at a detectable level for a longer distance than without the passive components 140. The passive components 140 may be used to change the propagation direction of the RF signals. The passive components 140 may be used to change the propagation mode of the RF signals. The passive components 140 may be used to change the polarization of the RF signals. The passive components 140 may be used to combine (or extract) multiple modes of RF signals. The passive components 140 may be used to shield the RF signals from interfering signals.

In the illustrated embodiment, the passive components 140 comprise a horn antenna 142 used to collect the RF signals from the first communication chip 118. The horn antenna 142 directs the RF signals in a certain direction. The horn antenna 142 collects the transmitted signals to facilitate longer pathlength communication. The horn antenna 142 has a trapezoidal shape with the wider end facing the chip 118 and the narrower end facing the other passive components 140 and/or the waveguide 108. The horn antenna 142 may have other shapes in alternative embodiments. Other types of collectors/directors may be used in alternative embodiments, such as other types of antennas, a polarizer, a reflector or another structure. In the illustrated embodiment, the horn antenna 142 is oriented generally perpendicular to the waveguide 108, however other orientations are possible in alternative embodiments.

In the illustrated embodiment, the passive components 140 include a mode converter 144. The mode converter 144 provides a transformation of the electromagnetic energy from one propagation mode to another. The mode converter 144 may affect the E-field and/or the B-field of the signal. The mode converter 144 may change a direction of the propagation path. In the illustrated embodiment, the mode converter 144 includes a T-shaped portion and a can portion however other types of mode converters may be used in alternative embodiments. The mode converter 144 may facilitate polarization changes to allow for free rotation of the waveguide 108 about the longitudinal axis. For example, the mode converter 144 may be a septum polarizer. The mode converter 144 may facilitate mode coupling for combining multiple waveguide modes from/to multiple transmitters/receivers.

Optionally, the first waveguide module 130 may have one or more active components in addition to the passive components 140. The active components may include an amplifier, a filter, a mode converter or another type of active component to enhance, alter or otherwise affect the signal and/or operation of the first waveguide module 130.

The second waveguide module 132 has one or more passive components 150 between the second communication chip 124 and the waveguide 108. The passive components 150 receive the wireless RF transmission from the waveguide 108 and convey the RF signal to the second communication chip 124 (the direction may be reversed when the second waveguide module 132 operates as a transmitter). Optionally, the passive components 150 may be integral with each other. Optionally, the passive components 150 may be integral with the waveguide 108. For example, the passive components 150 may be co-molded, extruded, machined or otherwise formed simultaneously with one another and/or the waveguide 108. In alternative embodiments, the passive components 150 may be separate from one another and/or the waveguide 108. In such embodiments, the passive components 150 may be positioned adjacent one another and/or the waveguide 108. The passive components 150 may abut against one another and/or the waveguide 108. The passive components 150 may be positioned proximate to one another and/or the waveguide 108.

The passive components 150 enhance the communication link between the first and second communication chips 118, 124. The passive components 150 may have desired characteristics to affect the RF signals in a particular way to enhance the RF signals. For example, the passive components 150 may be used to direct the RF signals to the second communication chip 124. The passive components 150 may be used to re-direct the RF signals along a predetermined path or in a certain direction. The passive components 150 may be used to extend the propagation distance of the RF signals. For example, the passive components 150 may maintain the signal at a sufficient strength at a detectable level for a longer distance than without the passive components 150. The passive components 150 may be used to change the propagation direction of the RF signals. The passive components 150 may be used to change the propagation mode of the RF signals. The passive components 150 may be used to change the polarization of the RF signals. The passive components 150 may be used to extract (or combine) multiple modes of RF signals. The passive components 150 may be used to shield the RF signals from interfering signals.

In the illustrated embodiment, the passive components 150 comprise a horn antenna 152 used to direct the RF signals to the second communication chip 124. The horn antenna 152 directs the RF signals in a certain direction. The horn antenna 152 has a trapezoidal shape with the wider end facing the chip 124 and the narrower end facing the other passive components 150 and/or the waveguide 108. The horn antenna 152 may have other shapes in alternative embodiments. Other types of structures may be used in alternative embodiments, such as other types of antennas, a polarizer, a reflector or another structure. In the illustrated embodiment, the horn antenna 152 is oriented generally perpendicular to the waveguide 108, however other orientations are possible in alternative embodiments.

In the illustrated embodiment, the passive components 150 include a mode converter 154. The mode converter 154 provides a transformation of the electromagnetic energy from one propagation mode to another. The mode converter 154 may affect the E-field and/or the B-field of the signal. The mode converter 154 may change a direction of the propagation path. In the illustrated embodiment, the mode converter 154 includes a T-shaped portion and a can portion however other types of mode converters may be used in alternative embodiments. The mode converter 154 may facilitate polarization changes to allow for free rotation of the waveguide 108 about the longitudinal axis. For example, the mode converter 154 may be a septum polarizer. The mode converter 154 may facilitate mode coupling for combining multiple waveguide modes from/to multiple transmitters/receivers.

Optionally, the second waveguide module 132 may have one or more active components in addition to the passive components 150. The active components may include an amplifier, a filter, a mode converter or another type of active component to enhance, alter or otherwise affect the signal and/or operation of the second waveguide module 132.

Figure 3:
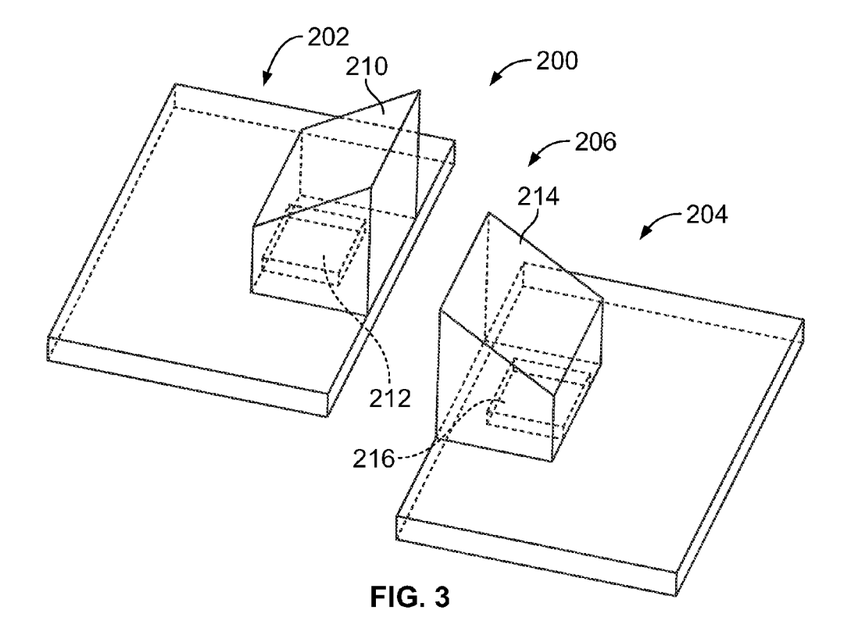
FIG. 3 illustrates a contactless connector formed in accordance with an exemplary embodiment.

FIG. 3 illustrates another contactless connector 200 formed in accordance with an exemplary embodiment. The connector 200 includes a first module 202 and a second module 204 that provides contactless data transmission at short range using RF energy. A propagation path is defined between the first and second modules 202, 204 and provides a defined transmission path for the RF energy between the first and second modules 202, 204. In an exemplary embodiment, the propagation path includes a waveguide structure 206 that guides the RF energy along a predetermined path between the first and second modules 202, 204.

The waveguide structure 206 includes a first reflector 210 covering a first communication chip 212 of the first module 202 and a second reflector 214 covering a second communication chip 216 of the second module 204. The reflectors 210, 214 direct the RF energy along the propagation path. The propagation path has an air gap forming part of the waveguide structure 206 between the first and second modules 202, 204. The air gap allows relative movement between the first and second modules 202, 204.

The reflectors 210, 214 direct the RF energy toward one another. The reflectors 210, 214 may include one or more metal or metalized surfaces that reflect the RF energy. The reflectors 210, 214 collect the RF signals and redirect the RF signals in a desired direction. The reflectors 210, 214 provide shielding from interfering signals. The reflectors 210, 214 are passive components that enhance the communication link between the first and second communication chips 212, 216. The reflectors are external structures to the first and second communication chips 212, 216. The reflectors 210, 214 have angled surfaces that direct the RF energy in an appropriate direction toward the other reflector 210, 214. The waveguide structure 206 is defined by the reflectors 210, 214 and the air gap therebetween.

Figure 4:
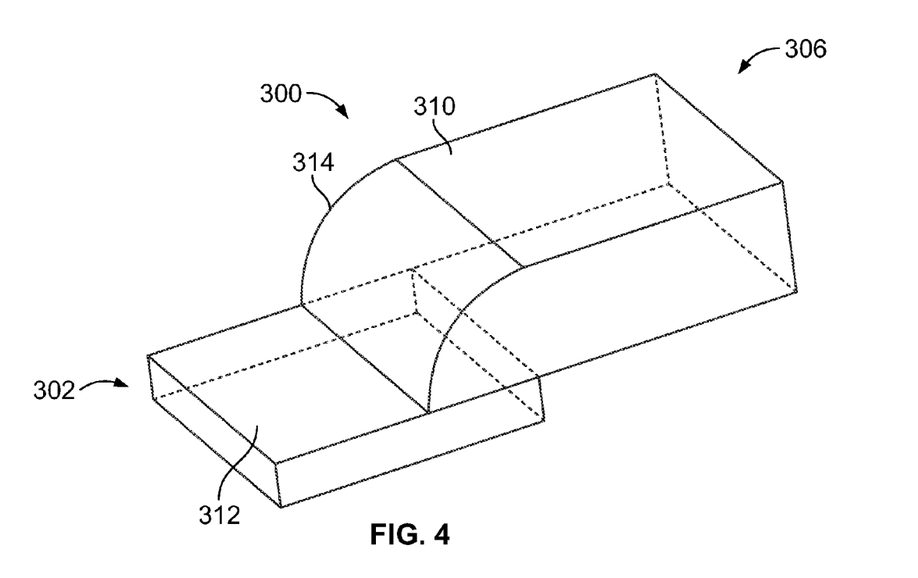
FIG. 4 illustrates a contactless connector formed in accordance with an exemplary embodiment.

FIG. 4 illustrates another contactless connector 300 formed in accordance with an exemplary embodiment. The connector 300 includes a first module 302 that provides contactless data transmission at short range using RF energy. A propagation path is defined by the first module 302 and provides a defined transmission path for the RF energy to and from the first module 302. In an exemplary embodiment, the propagation path includes a waveguide structure 306 that guides the RF energy along a predetermined path.

The waveguide structure 306 includes a reflector 310 provided proximate to a communication chip 312 of the first module 302. The reflector 310 directs the RF energy along the propagation path to and/or from the communication chip 312. The propagation path may have an air gap forming part of the waveguide structure 306.

The reflector 310 directs the RF energy generally in a desired direction. The reflector 310 has a curved surface 314 that changes the direction of the RF energy. The curved surface 314 is a reflective surface for the RF energy. The reflector 310 may include other reflective surface for the RF energy.

The curved surface 314 may be defined by metalizing the outer surface of the reflector 310. The reflector 310 may provide shielding from interfering signals. The reflector 310 is a passive component that enhances the communication link.

Figure 5:
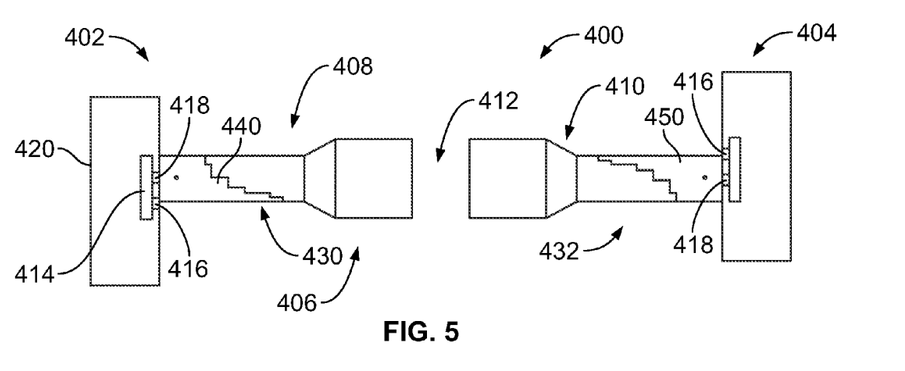
FIG. 5 illustrates a contactless connector formed in accordance with an exemplary embodiment.
Figure 6:
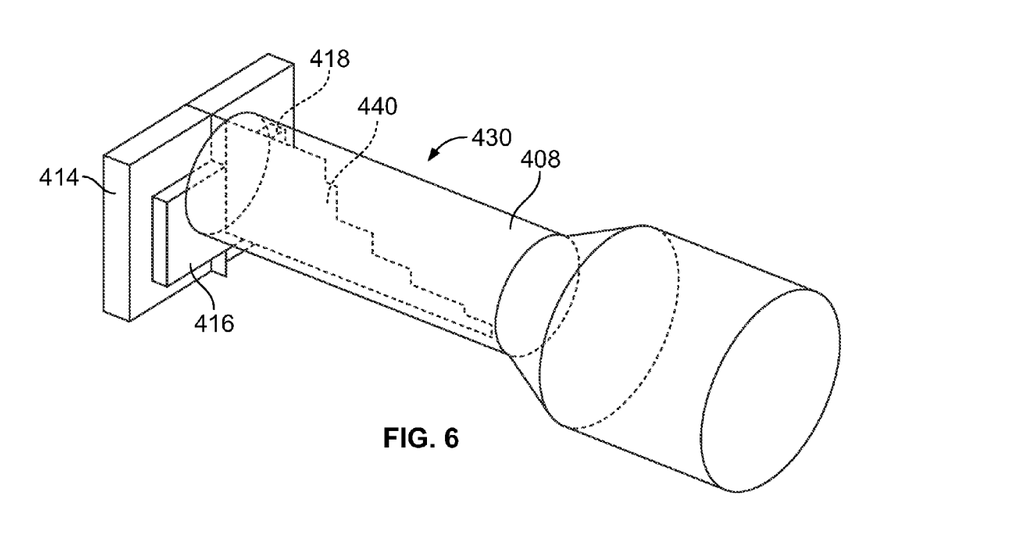
FIG. 6 illustrates a first module and a second module of the contactless connector shown in FIG. 5.

FIG. 5 illustrates another contactless connector 400 formed in accordance with an exemplary embodiment. The connector 400 includes a first module 402 and a second module 404 that provides contactless data transmission at short range using RF energy. FIG. 6 illustrates the first module 402 and the second module 404 may be similar and include similar components. A propagation path is defined between the first and second modules 402, 404 and provides a defined transmission path for the RF energy between the first and second modules 402, 404. In an exemplary embodiment, the propagation path includes a waveguide structure 406 that guides the RF energy along a predetermined path between the first and second modules 402, 404. The waveguide structure 406 may extend along only part of the path between the first and second modules 402, 404. The waveguide structure 406 may be any type of propagation path, including an air gap between the first and second modules 402, 404.

In the illustrated embodiment, the waveguide structure 406 is defined by a first waveguide 408 and a second waveguide 410 separated by an air gap 412. The first and second waveguides 408, 410 are aligned. The first and second waveguides 408, 410 allow relative rotation and/or linear translation therebetween.

In an exemplary embodiment, the first module 402 defines a transmitter (and/or a receiver) and the second module 404 defines a receiver (and/or a transmitter) for receiving the RF energy emitted by the transmitter. Optionally, the first module 402 may define both a transmitter and a receiver and the second module 404 may define both a transmitter and a receiver. The first and second modules 402, 404 may allow single directional communication or may allow bi-directional communication.

As shown in FIG. 6, the first module 402 includes a circuit board 414 having a first communication chip 416 that emits RF signals and a second communication chip 418. The communication chips 416, 418 may define a transmitter chip, a receiver chip or a transceiver chip that is able to both transmit and receive. As shown in FIG. 5, the circuit board 414 may be held in a housing 420, such as a metal housing that provides electrical shielding.

The waveguide structure 406 includes a first waveguide module 430 at one end and a second waveguide module 432 at the other end. The first and second waveguide modules 430, 432 direct the RF signals from/to the chips 416, 418 of the first and second modules 402, 404. The waveguide 408 is part of the first waveguide module 430 and the waveguide 410 is part of the second waveguide module 432. The waveguides 408, 410 may provide shielding from interfering signals. The waveguides 408, 410 may be a hollow metal tube, such as a copper tube. The waveguides 408, 410 may be a plastic, ceramic, glass or other body. The waveguides 408, 410 may be cylindrical or may have other shapes in alternative embodiments. The waveguides 408, 410 may extend along a longitudinal axis or may extend along a curved or angled path.

The first waveguide module 430 has one or more passive components 440 between the communication chips 416, 418 and the waveguide 408. In the illustrated embodiment, the passive component 440 is represented by a septum polarizer. The passive component 440 is designed to operate at a particular frequency or frequency range, such as approximately 60 GHz. The passive component 440 is designed to propagate the RF energy in a particular direction and mode. In an exemplary embodiment, the passive component 440 forms different modes so the waveguide structure 406 can pass multiple modes at once. The passive component 440 enhances the communication link between the first and second modules 402, 404.

The second waveguide module 432 has one or more passive components 450 between the communication chips 416, 418 and the waveguide 410. In the illustrated embodiment, the passive component 450 is represented by a septum polarizer. The passive component 450 is designed to operate at a particular frequency or frequency range, such as approximately 60 GHz. The passive component 450 is designed to propagate the RF energy in a particular direction and mode. In an exemplary embodiment, the passive component 450 forms different modes so the waveguide structure 406 can pass multiple modes at once. The passive component 450 enhances the communication link between the first and second modules 402, 404.

Figure 7:
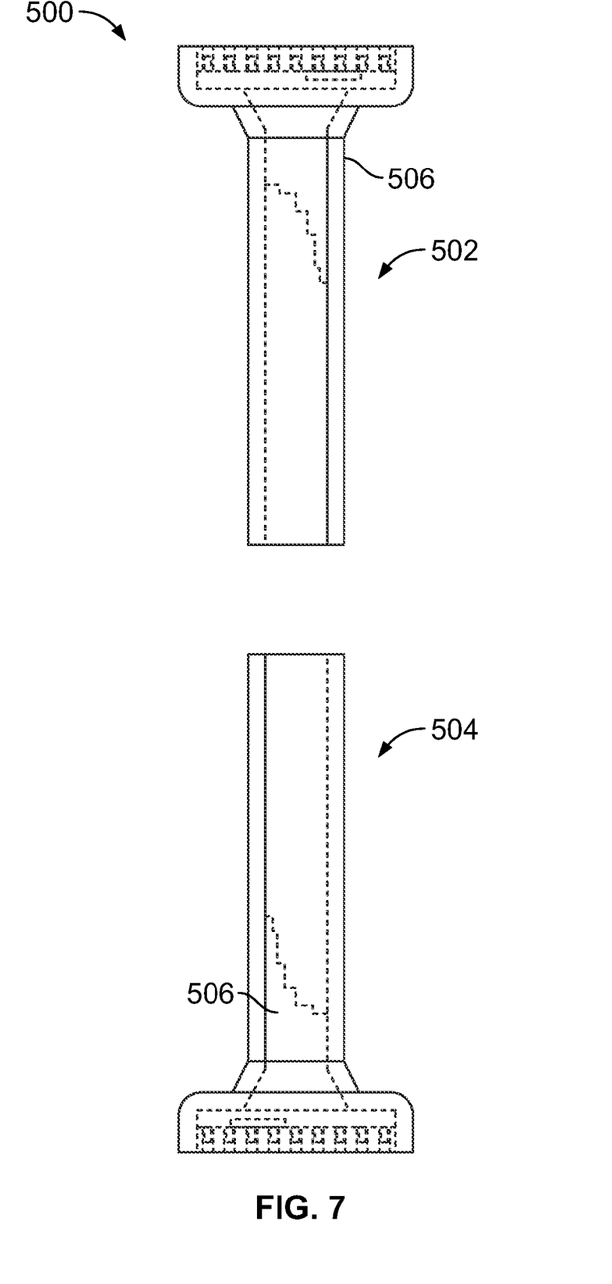
FIG. 7 illustrates a contactless connector formed in accordance with an exemplary embodiment.

FIG. 7 illustrates another contactless connector 500 formed in accordance with an exemplary embodiment. The contactless connector 500 includes a first module 502 and a second module 504 that provides contactless data transmission at short range using RF energy. A propagation path is defined between the first and second modules 502, 504 and provides a defined transmission path for the RF energy between the first and second modules 502, 504.

In an exemplary embodiment, the propagation path includes waveguide structures 506 of the modules 502, 504 that guide the RF energy along a predetermined path. Each waveguide structure 506 extends along only part of the path between the first and second modules 502, 504. Optionally, the propagation path may include other waveguides between the waveguide structures 506, such as an air gap, dielectric, plastic, glass or other material between the waveguide structures 506. In the illustrated embodiment, the waveguide structures 506 are aligned. The waveguide structures 506 allow relative rotation and/or linear translation therebetween.

In an exemplary embodiment, the first module 502 includes both a transmitter and a receiver and the second module 504 includes both a transmitter and a receiver. The contactless connector may allow duplex communication.

Figure 8:
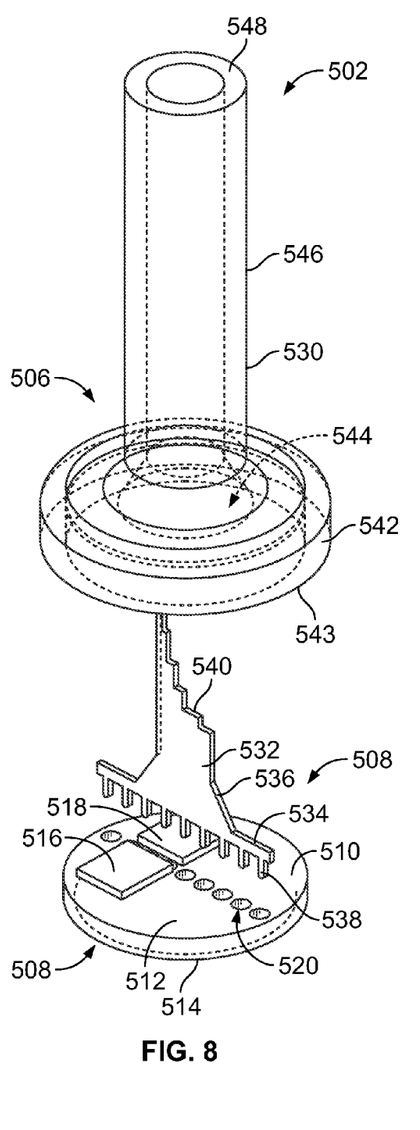
FIG. 8 is an exploded view of a first module of the contactless connector shown in FIG. 7.
Figure 9:
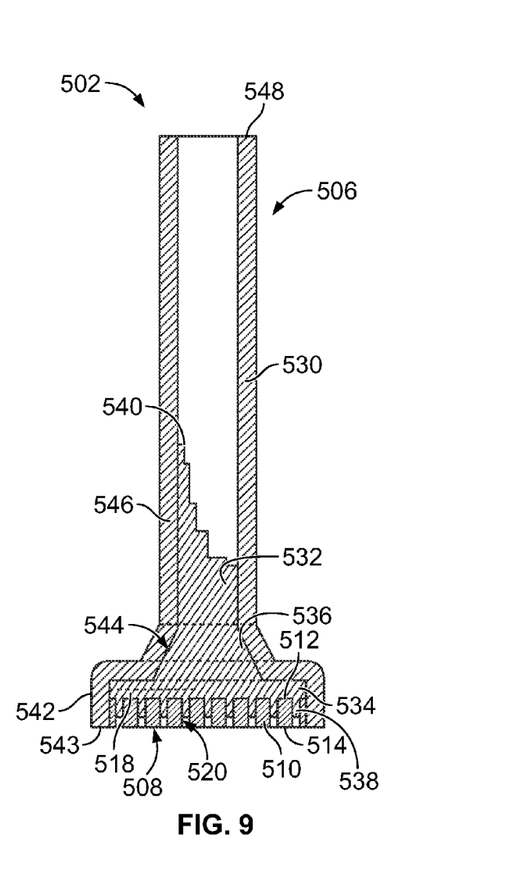
FIG. 9 is a cross-sectional view of the first module shown in FIG. 8.

FIG. 8 is an exploded view of the first module 502 and FIG. 9 is a cross-sectional view of the first module 502, however, it is realized that the second module 504 (shown in FIG. 7) may be similar and include similar components. Optionally, the modules 502, 504 may be identical or may be mirrored halves.

The first module 502 includes the waveguide structure 506 and a communication module 508. The communication module 508 is configured for RF data communication. The communication module 508 includes a circuit board 510 having a top 512 and a bottom 514. In the illustrated embodiment, the circuit board 510 is circular, however, other shapes are possible in alternative embodiments. Optionally, the communication module may include more than one circuit board 510, such as two semi-circular circuit boards.

The communication module 508 includes a first communication chip 516 and a second communication chip 518 mounted to the top 512 of the circuit board 510. The communication chips 516, 518 may be transmitter chips, receiver chips or transceiver chips that are able to both transmit and receive. In an exemplary embodiment, the first communication chip 516 is a transmit communication chip and may be referred to hereinafter as a transmit communication chip 516. In an exemplary embodiment, the second communication chip 518 is a receive communication chip and may be referred to hereinafter as a receive communication chip 518.

The transmit and receive communication chips 516, 518 are mounted directly to the circuit board 510. Optionally, the transmit and receive communication chips 516, 518 may be offset from a center of the circuit board 510, such as toward one side of the circuit board 510. In the illustrated embodiment, both the transmit and receive communication chips 516, 518 are offset in a common direction; however, other orientations of the transmit and receive communication chips 516, 518 are possible in alternative embodiments.

In an exemplary embodiment, the circuit board 510 includes conductive vias 520 extending through the circuit board 510. The conductive vias 520 may be aligned along a diameter of the circuit board 510. The transmit and receive communication chips 516, 518 may be staggered on opposite sides of the line of conductive vias 520. The conductive vias 520 may be electrically grounded and may provide electrical isolation between the transmit and receive communication chips 516, 518 on opposite sides thereof The waveguide structure 506 includes a waveguide body 530 and a septum 532 configured to be received in the waveguide body 530. The septum 532 is configured to be mounted to the circuit board 510, such as to the conductive vias 520. The septum 532 is a metal structure. Optionally, the septum 532 may be planar. The septum 532 provides isolation for RF signals communicated through the waveguide body 530. For example, the septum may isolate the RF signals associated with the transmit communication chip 516 from the RF signals associated with the receive communication chip 518. The septum 532 divides the waveguide body 530 into different chambers, such as in half, along at least a portion of the waveguide body 530.

In an exemplary embodiment, the septum 532 is sized and shaped to fit in the waveguide body 530. The septum 532 may abut against an internal surface of the waveguide body 530. For example, the septum 532 may be held in the septum by an interference fit. Contact between the septum 532 and the waveguide body 530 electrically connects the septum 532 to the waveguide body 530, electrically commoning the structures to enhance RF shielding and/or isolation.

The septum 532 is designed to propagate the RF energy in a particular direction and mode. In an exemplary embodiment, the septum 532 forms different modes so the waveguide structure 506 can pass multiple modes at once. The septum 532 enhances the communication link between the first and second modules 502, 504. The septum 532 may be shaped to control characteristics of the RF signals in a particular way to enhance the RF signals. For example, the septum 532 may be shaped and oriented within the waveguide body 530 to tune the contactless connector 500 to a desired frequency or frequency range, such as approximately 60 GHz. The septum 532 may be sized, shaped and positioned in the waveguide body 530 to collect the RF signals from the first communication chip 518. The septum 532 may be sized, shaped and positioned in the waveguide body 530 to re-direct the RF signals along a predetermined path or in a certain direction. The septum 532 may be sized, shaped and positioned in the waveguide body 530 to extend the propagation distance of the RF signals. For example, the septum 532 may be sized, shaped and positioned in the waveguide body 530 to maintain the signal at a sufficient strength at a detectable level for a longer distance than without the septum 532. The septum 532 may be used to change the propagation direction of the RF signals. The septum 532 may be used to change the propagation mode of the RF signals. The septum 532 may be used to change the polarization of the RF signals. The septum 532 may be used to combine (or extract) multiple modes of RF signals. The septum 532 may be used to shield the RF signals from interfering signals.

In the illustrated embodiment, the septum 532 includes a base 534, a transition portion 536 extending from the base 534 and a distal end portion 536 extending from the transition portion 536. Mounting posts 538 extend downward from the base 534. The mounting posts 538 are configured to be received in corresponding conductive vias 520 in the circuit board 510 to mechanically and electrically connect the septum 532 to the circuit board 510. The septum 532 may be electrically commoned with a grounding plane of the circuit board 510.

The transition portion 536 is shaped to fit within the waveguide body 530 and has a complementary shape to the interior surface of the waveguide body 530. In the illustrated embodiment, the transition portion 536 has angled edges, giving the transition portion 536 a variable width between the base 534 and the distal end portion 536. The base 534 is generally wider than the transition portion 536. The base 534 may be approximately as wide as a diameter of the circuit board 510 to span the entire circuit board 510 and provide electrical shielding between the transmit and receive communication chips 516, 518.

The distal end portion 536 is shaped to affect the RF signals transmitted through the waveguide structure 506. In the illustrated embodiment, the distal end portion 536 includes a stepped arrangement at the distal end 540. The number of steps, the height and width of each particular step, and the like may be controlled to affect the RF signals, such as to tune the RF signals to a particular frequency or frequency range. Other shapes or features may be provided at the distal end portion 536 to affect the RF signals.

The waveguide body 530 may be manufactured from a metal material, such as copper; however may be made of other materials in alternative embodiments, such as plastic, ceramic, glass or other body. The waveguide body 530 may be conductive to provide electrical shielding. The waveguide body 530 includes a base 542 defining a first end 543 of the waveguide body 530. The base 542 has a receptacle 544 that receives the septum 532 and the circuit board 510. The receptacle 544 is sized and shaped to receive the septum 532 and the circuit board 510, and optionally, may receive the septum 532 and/or the circuit board 510 by an interference fit. The waveguide body 530 includes a tube 546 extending from the base 542 to a second end 548 of the waveguide body 530. The tube 546 may be cylindrical and extends longitudinally along a longitudinal axis of the waveguide body 530. The tube 546 has a smaller diameter than the base 542. In an exemplary embodiment, the tube 546 is hollow and receives a portion of the septum 532, such as the distal end portion 536. In the illustrated embodiment, the septum 532 extends approximately ⅓ of the length of the tube 546; however the septum 532 may extend a greater or lesser amount into the tube 546. The tube 546 directs RF signals to and from the septum 532. The septum 532 divides the interior of the tube 546 into two chambers, which may be of equal size. Optionally, the base 542 and the receptacle 544 may be frustoconical shaped with the tube 546 at the smaller end of the receptacle 544. The RF signals are guided between the tube 546 and the communication module 508 through the frustoconical shaped portion of the receptacle 544.

Figure 10:
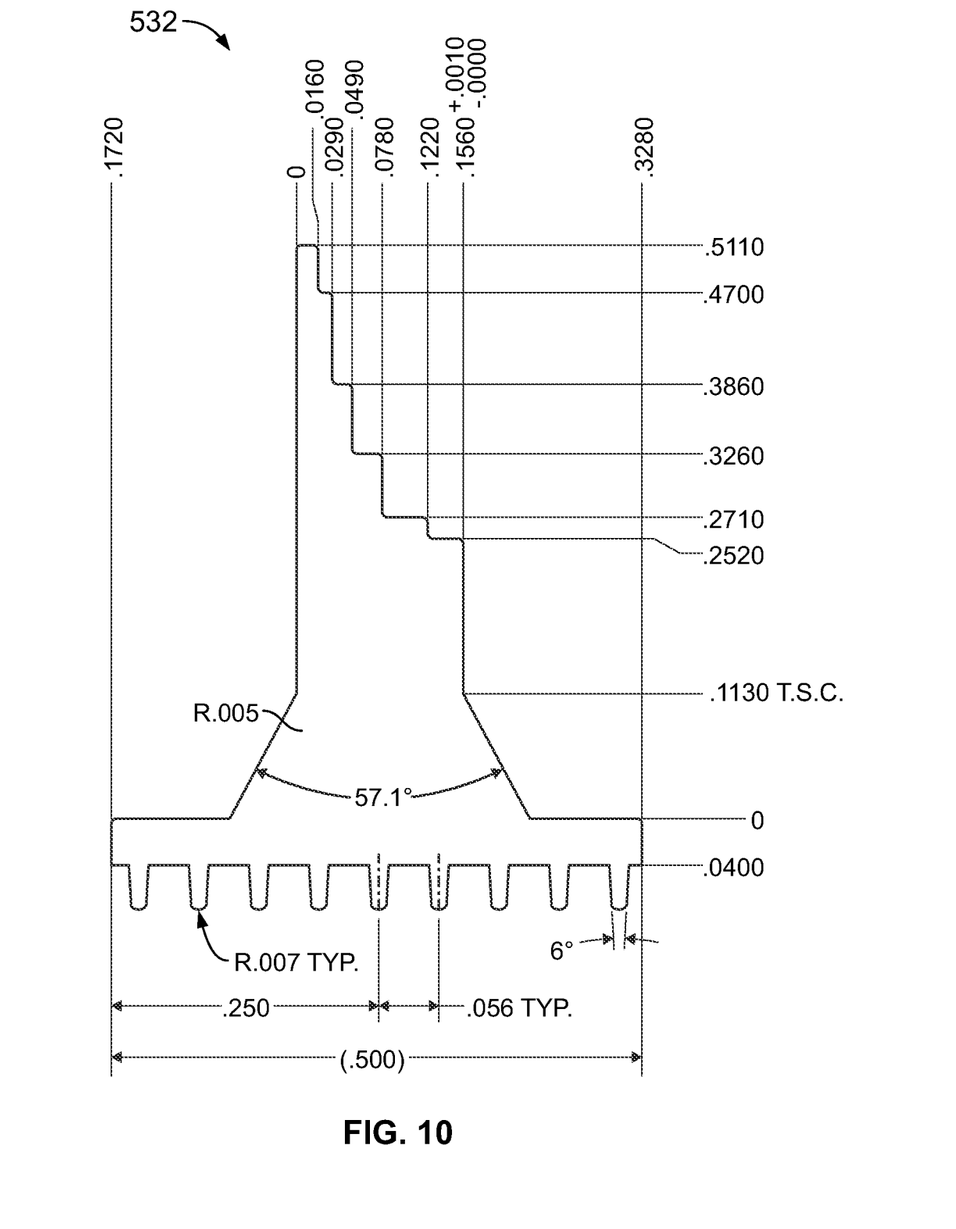
FIG. 10 illustrates an exemplary embodiment of a septum of the first module.
Figure 11:
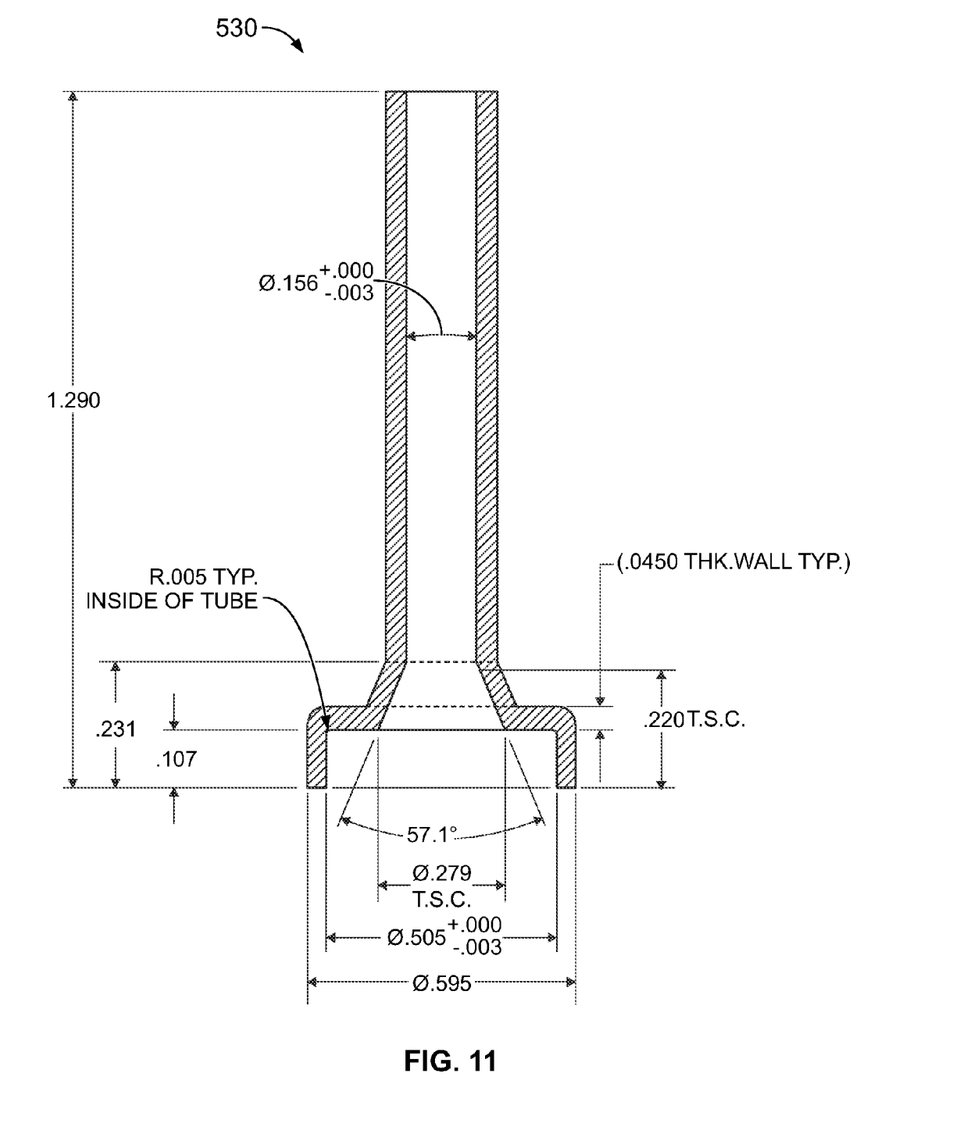
FIG. 11 illustrates an exemplary embodiment of a waveguide body of the first module.

FIG. 10 illustrates an exemplary embodiment of the septum 532, showing dimensions designed to operate with the waveguide body 530 (shown in FIG. 11) at a particular frequency or frequency range, such as approximately 60 GHz. FIG. 11 illustrates an exemplary embodiment of the waveguide body 530, showing dimensions designed to operate with the septum 532 (shown in FIG. 10) at a particular frequency or frequency range, such as approximately 60 GHz. Changes to the dimensions, shape or features may allow operation at a different frequency or frequency range. The dimensions are shown in inches.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A contactless connector comprising:
a waveguide structure comprising a waveguide body extending between a first end and a second end and a septum received in the waveguide body and extend at least partially along an interior of the waveguide body, the septum dividing at least a portion of the waveguide body into a first chamber and a second chamber, the waveguide structure conveying RF signals between the first and second ends;
a communication module comprising a circuit board positioned at the first end of the waveguide body, the communication module having a transmit communication chip configured to transmit wireless RF signals and a receive communication chip configured to receive wireless RF signals, the transmit and receive communication chips being coupled to the circuit board;
wherein the waveguide guides the RF signals from and to the transmit and receive communication chips, and wherein the septum isolates the RF signals associated with the transmit communication chip from the RF signals associated with the receive communication chip for at least a portion of a length of the waveguide body.

2. The contactless connector of claim 1, wherein the septum is directly coupled to the circuit board and extends from the circuit board along the waveguide body for a length of the waveguide body.

3. The contactless connector of claim 1, wherein the waveguide body comprises a receptacle at the first end and a tube at the second end, the tube having a smaller diameter than a diameter of the receptacle, the circuit board and transmit and receive communication chips being received in the receptacle, the receptacle guiding the RF signals between the communication module and the tube.

4. The contactless connector of claim 3, wherein the receptacle is frustoconical shaped with the tube at the smaller end of the receptacle, the RF signals being guided between the tube and the communication module through the frustoconical shaped portion of the receptacle.

5. The contactless connector of claim 1, wherein the septum has a distal end opposite the communication module, the distal end being stepped.

6. The contactless connector of claim 1, wherein the circuit board includes a ground plane and conductive vias electrically connected to the ground plane, the septum having mounting posts received in the conductive vias to electrically connect the septum to the ground plane of the circuit board.

7. The contactless connector of claim 1, wherein the septum engages an internal surface of the waveguide body by in interference fit.

8. The contactless connector of claim 1, wherein the septum is electrically commoned with the waveguide body.

9. The contactless connector of claim 1, wherein the septum is profiled to match an interior surface of the waveguide body.

10. The contactless connector of claim 1, wherein the waveguide body extends along a longitudinal axis, the communication module being received within the waveguide body such that the transmit and receive communication chips are offset from the longitudinal axis toward one side of the waveguide body in a common direction.

11. The contactless connector of claim 1, wherein the waveguide body redirects the corresponding RF signals from and to the corresponding transmit and receive communication chips.

12. The contactless connector of claim 1, wherein the waveguide body changes a propagation mode of the corresponding RF signals from and to the corresponding transmit and receive communication chips.

13. The contactless connector of claim 1, wherein the waveguide structure combines multiple modes of RF signals allowing duplex communication.

14. A contactless connector comprising:
a waveguide structure comprising a first waveguide module and a second waveguide module configured to wirelessly communication RF signals therebetween, the first waveguide module having a first waveguide body and a first septum received in the first waveguide body, the second waveguide module having a second waveguide body and a second septum received in the second waveguide body;
a first communication module coupled to the first waveguide module, the first communication module comprising a first circuit board having a transmit communication chip and a receive communication chip on the first circuit board, wherein the first waveguide module guides corresponding RF signals from and to the transmit and receive communication chips, and wherein the first septum isolates the RF signals associated with the transmit communication chip from the RF signals associated with the receive communication chip for at least a portion of a length of the first waveguide body; and
a second communication module coupled to the second waveguide module, the second communication module comprising a second circuit board having a transmit communication chip and a receive communication chip on the second circuit board, wherein the second waveguide module guides corresponding RF signals from and to the transmit and receive communication chips, and wherein the second septum isolates the RF signals associated with the transmit communication chip from the RF signals associated with the receive communication chip for at least a portion of a length of the second waveguide body.

15. The contactless connector of claim 14, wherein the septum is directly coupled to the circuit board and extends from the circuit board along the waveguide body for a length of the waveguide body.

16. The contactless connector of claim 14, wherein the waveguide body comprises a receptacle at the first end and a tube at the second end, the tube having a smaller diameter than a diameter of the receptacle, the circuit board and transmit and receive communication chips being received in the receptacle, the receptacle being frustoconical shaped with the tube at the smaller end of the receptacle, the RF signals being guided between the tube and the communication module through the frustoconical shaped portion of the receptacle.

17. The contactless connector of claim 14, wherein the septum has a distal end opposite the communication module, the distal end being stepped.

18. The contactless connector of claim 14, wherein the circuit board includes a ground plane and conductive vias electrically connected to the ground plane, the septum having mounting posts received in the conductive vias to electrically connect the septum to the ground plane of the circuit board.

19. The contactless connector of claim 14, wherein the septum engages an internal surface of the waveguide body by in interference fit.

20. The contactless connector of claim 14, wherein the septum is electrically commoned with the waveguide body.

* * * * *